J. LEE.
POST-HOLE DIGGERS.
No. 171,942. Patented Jan. 11, 1876.
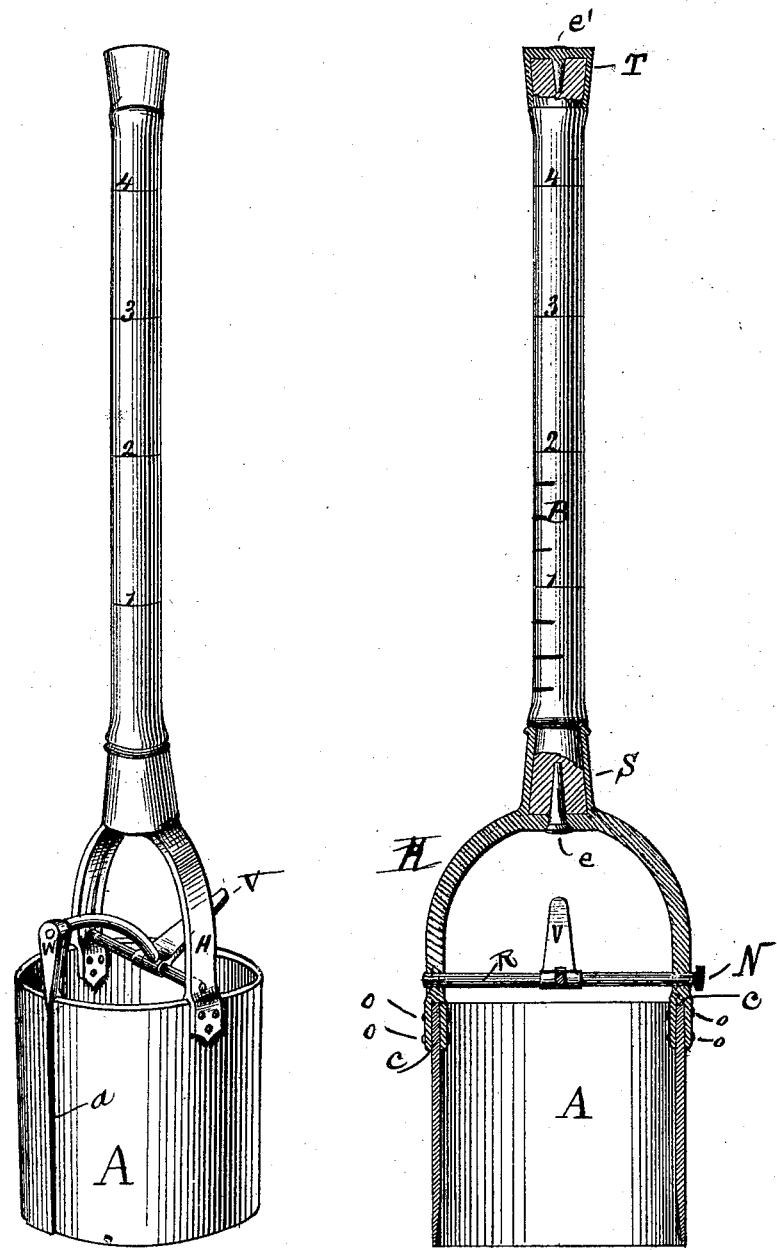
Witnesses: J. C. Clayton, Christian G. Moritz
John Lee

UNITED STATES PATENT OFFICE.

JOHN LEE, OF MASSILLON, OHIO.

IMPROVEMENT IN POST-HOLE DIGGERS.

Specification forming part of Letters Patent No. 171,942, dated January 11, 1876; application filed May 17, 1875.

*To all whom it may concern:*

Be it known that I, JOHN LEE, of Massillon, Ohio, have invented certain new and useful Improvements in Post-Hole Diggers; and I do hereby declare that the following is a full, clear, and exact description thereof, reference being had to the accompanying drawings, forming a part of this specification.

Figure 1 is a vertical section. Fig. 2 is a perspective view.

This invention relates to a post-hole digger consisting of a steel or iron cylinder about six or seven inches in diameter, and of about the same depth, having both ends open, and the lower edge sharpened, and being formed out of a plate of metal bent up cylindrically, the ends just touching, but not welded or fastened, and provided with a handle, substantially as set forth; and it consists, first, in making the bail of malleable cast-iron, with bifurcated ends to clasp each side of the blade, and hold the same firmly between the parts thereof and against the continuous shoulder by which the separated ears or ends are connected, and with a handle-socket in shape like the frustum of a cone, having a central wedge or pin to expand the handle and make it fill the socket when driven home; second, in a pivoted wedge or opener fitted to enter the cleft between the edges of the blade, and cause the same to expand and release the dirt which is held within.

A is the steel cylinder, which is similar to a wad-cutter. *a* is the cleft to allow of the expansion and contraction of the cutter A, and give grasp to the earth which it removes. H is the improved handle or bail, which is preferably made of malleable cast-iron. The ends of the bail H are cleft at *c*, so as to grasp and fit down upon the upper edge of the cutter A, to which they are secured by rivets *o o o*. The top of the bail H is provided with a socket, S, for the reception of the handle B. This socket is cast as part of the bail, and is conical, having the largest diameter at the bottom, so that when the handle is inserted and driven home the handle will be expanded, so as to fit immovably in said socket. The pin may be cast in the bottom of the socket. I is a cast-iron head or tamper, having the same construction as the socket and pin *e*, for the purpose of securing it to the upper end of handle B.

When the soil to be worked in is very tough I use a wedge, W, and treadle V, pivoted to rod R, for the purpose of forcing apart the cleft *a*, so as to enlarge the cutter, and more readily discharge the soil contained in it. In light dry soils I turn up the nut N on rod R, so as to allow as little expansion as possible. In ordinary soils there is no need of either of these attachments.

The handle can be marked off into feet and inches for convenience in measuring.

The instrument is forced down into the soil in the manner of a crow-bar with the hands, and the feet may assist as with a spade. It is then removed vertically, carrying with it, say, one or more inches of earth, which is discharged by striking the edge or side of the digger at an angle on the ground near the hole. In this way post-holes may be dug with far greater rapidity than in the common way. The malleable bail is much cheaper in construction than a wrought-iron handle, and is as good, if not better, and the mode of securing the wooden handle to the socket is a valuable improvement, and is better and cheaper than an iron handle.

What I claim is—

1. The cast-iron bail H, constructed with bifurcated ends *c c*, conical socket S, and pin *e*, for the purpose set forth.

2. The wedge W, acting in combination with cutter A, substantially as set forth.

JOHN LEE.

In presence of—
   J. C. CLAYTON,
   CHRISTIAN G. MORITZ.